July 11, 1933. J. W. BARTON 1,917,570
MOP HANDLE CONNECTION AND METHOD FOR MAKING THE SAME
Filed June 13, 1931
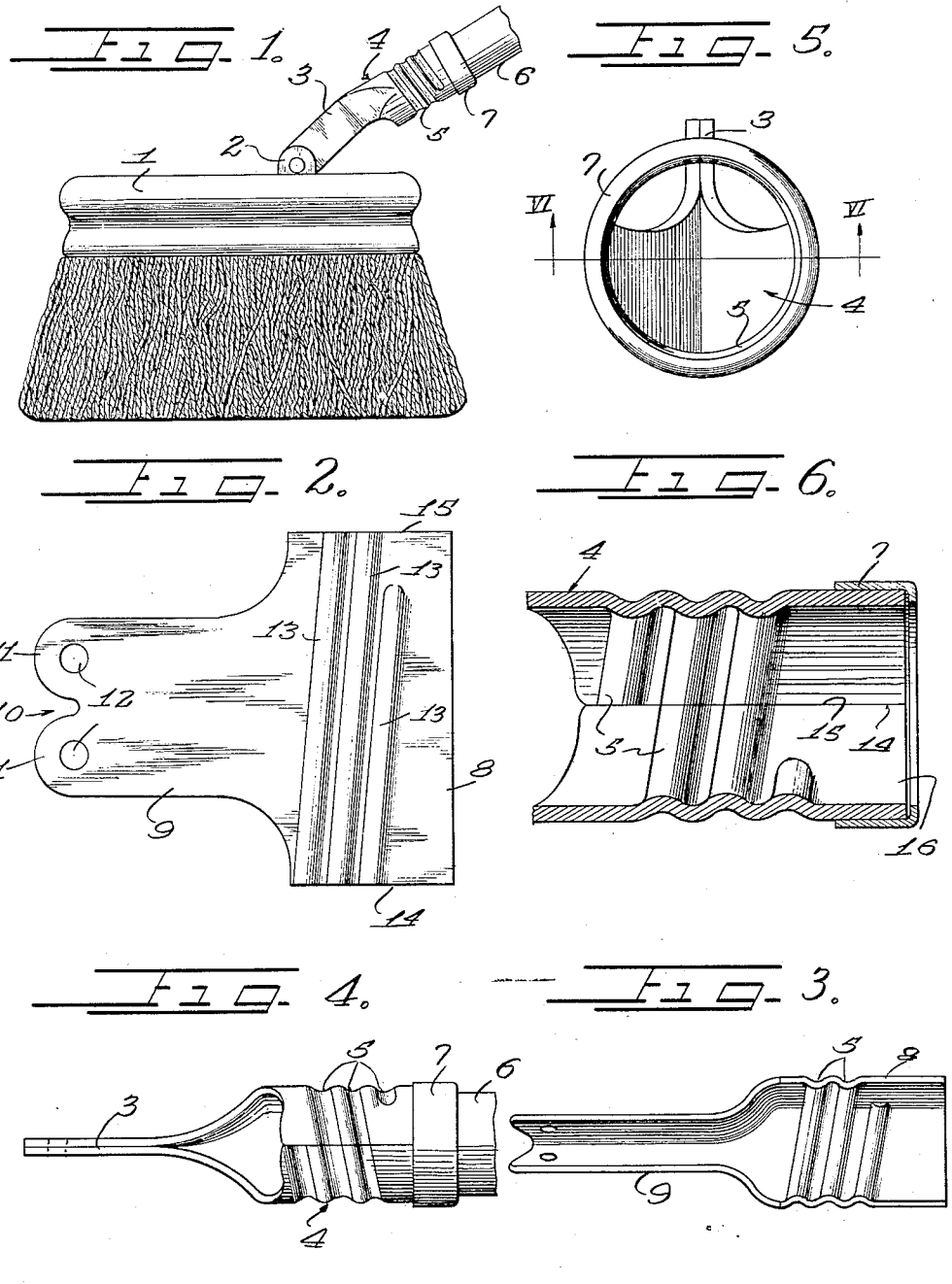
Inventor
Joseph W. Barton.
by Charles Hills
Attys.

Patented July 11, 1933

1,917,570

UNITED STATES PATENT OFFICE

JOSEPH W. BARTON, OF CHICAGO, ILLINOIS, ASSIGNOR TO O-CEDAR CORP'N., OF CHICAGO, ILLINOIS, A CORPORATION OF ILLINOIS

MOP HANDLE CONNECTION AND METHOD FOR MAKING THE SAME

Application filed June 13, 1931. Serial No. 544,091.

This invention has to do with mops and the like, and relates particularly to means by which the mop head may be detachably connected to a handle.

In the past, it has been common to provide detachable handle connections for mops, characterized by a handle socket pivotally or otherwise attached to the mop head, and formed of sheet metal or other material. The lower end of the handle has been formed with a thread, the handle itself being practically universally made of wood. It has been deemed sufficient in the past to provide the socket member with projections extending inwardly of the socket member and arranged in a relation corresponding with the pitch of the thread on the handle end, to thereby afford a threaded socket for the handle end.

This construction has been found to have a serious defect for the reason that when the threaded handle end is first inserted into the socket, in a majority of instances the socket member projections are not properly positioned with respect to the handle end thread, and users of the mop, in their impatience, often times force the threaded end of the handle directly into the socket, thereby forceably embedding the projections into the threaded portion of the handle and also mutilating said threaded portion.

It is accordingly one of the principal objects of this invention to provide a mop handle socket member of sheet metal or the like by which proper attachment of the threaded end of the wooden or the like handle will be so facilitated as to eliminate loss of time in making the connection and also avoid mutilation of both the socket member and the threaded end of the handle.

Another defect in previous mop handle sockets, especially of the sheet metal or the like type, resides in the fact that the repeated operations of inserting the handle end into the socket member resulted in the gradual separation of the longitudinal meeting edges of the socket member, with a resultant marked decrease in efficiency of the connection.

It is accordingly a further object of the invention to prevent separation of the longitudinal meeting edges of the sheet metal or like socket member, thereby maintaining maximum efficiency of the connection at all times.

It is another object of the present invention to employ an improved method of forming a continuous thread in a sheet metal or like socket.

A further object resides in the provision of a sheet metal or like socket member involving an improved method of construction, comprising a minimum of parts, and having such durable characteristics that, for all practical purposes, it will never get out of order in service.

In carrying out the invention, I blank out a piece of sheet metal in the general form of a T, the end of the shank of which I provide with a pair of openings. The head of the T is then provided with one or more grooves or corrugations, which may be stamped, rolled or otherwise formed preferably while the blank is in a flat position, and preferably inclined to the ends of the head. The head is then formed substantially cylindrical, the grooves or corrugations constituting a continuous thread having substantially the pitch of the thread of the handle end to be inserted therein, and the shank is folded upon itself to bring the openings into registration, so that the end of the shank may provide with the mop head a pivotal connection. A thimble is applied to the free end of the cylindrical head of the socket member by a pressed fit and thereby retains the cylindrical portion permanently in the proper shape.

Further objects and advantages of the invention will be apparent as the description proceeds.

On the drawing:

Figure 1 is a fragmentary elevational view of the head of the handle connection constructed in accordance with the present invention.

Figure 2 is an enlarged view of a socket member made in accordance with the present invention, in an intermediate stage of construction.

Figure 3 is a view of the same in a somewhat advanced stage of construction.

Figure 4 is a view similar to Figure 3 but showing the completed socket member, and a portion of a handle end projecting therefrom.

Figure 5 is an enlarged end elevational view of my improved socket construction.

Figure 6 is a fragmentary sectional view taken approximately in the plane indicated by the line VI—VI of Figure 5.

Referring now more particularly to the drawing, wherein the same parts are indicated in every instance by the same reference character, the mop head 1 is provided with pivot ears 2 between which the extension 3 of a socket member 4 is pivotally connected, the opposite end portion of the socket member 4 being provided with a thread 5 for threadedly receiving a correspondingly formed end of a wooden or like handle 6.

A thimble or sleeve 7 surrounds the threaded end of the socket 4 and is tightly connected to the latter. The socket member 4 is preferably made of sheet metal, and while the thread 5 thereof, as well as the pivot extension 3, could be made in various ways, I have devised a method of so doing which is very expeditious and efficient. To this end, I blank out a piece of sheet metal or the like into the form of a T as shown in Figure 2, having a head 8 and a shank 9. The free end 10 of the shank 9 has its contour in the form of a curved W, the portions 11 being formed with openings 12. After the blank is formed, one or more grooves or corrugations 13 are formed, by stamping, rolling, or the like, at least one such groove or corrugation extending along a major portion or the full length of the head 8 from one edge 14 to the other edge 15. Each groove or corrugation 13 has a pitch corresponding with that of the threaded end of the handle 6.

After the grooves or corrugations 13 are formed, the blank is subjected to a shaping operation, by which it is bent along the axis of symmetry of the T, the shank 9 taking the form of a V and the head 8 that of a U, as seen in Figure 3. The bending is now continued until the edges 14 and 15 substantially meet as shown in Figures 4 and 6, the socket portion or T-head 8 being in the form of a cylinder, and the shank 9 being folded flat upon itself to form the extension 3 comprising a double thickness of the metal. It will be seen that where a plurality of grooves or corrugations 3 are provided, as in the present instance, they are so spaced that when the cylindrical socket portion is formed, each groove forms a continuation of the adjacent groove. Thus a continuous groove or thread is formed. The sleeve or ferrule 7 is thereupon secured on the free end 16 by a pressed fit, thereby permanently maintaining the cylindrical socket member in proper shape. It will be noted that when the two portions of the shank 9 are folded flat upon each other as shown in Figure 4, the pivot openings 12 will be in register, and the pivot extension 3 may be placed between the mop head ears 2 and pivotally connected thereto as heretofore mentioned.

It will be appreciated that, if desired, the openings 12 and the grooves or corrugations 13 could be formed after the blank has been given its final shape, although the method herein described in detail is preferred as being simpler.

It will thus be seen that the threaded connection involves a substantial improvement over those heretofore in use, not only from the standpoint of efficiency in use but also from the standpoint of the method of making. The pivot connection, it will be noted, is so constructed that the thrust will be exerted transversely of the pivot pin, which of course will be made sufficiently strong to stand up in service, and in a direction parallel to the plane of the pivot extension 3 and the ears 2, so that said extension and ears will not give way under stress of use of the mop, even after a long period of such use.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. As an article of manufacture, a coupling for connecting a mop handle to a mop head, said coupling being formed of a single longitudinally split socket having a continuous thread of an extent greater than one-half of the circumference of the socket, and an endless collar for preventing separation of the edges adjacent the split, said collar including an annular reinforcing flange disposed over one end of the coupling.

2. As an article of manufacture, a coupling for connecting a mop handle to a mop head, said coupling being formed of a single longitudinally split socket having a continuous thread of an extent greater than one-half of the circumference of the socket, and means for preventing separation of the edges adjacent the split, said means surrounding said socket, and including an inwardly radially extending reinforcing flange disposed over one end of the coupling.

3. As an article of manufacture, a coupling for connecting a mop handle to a mop head, said coupling being formed of a single longitudinally split socket having a continuous thread of an extent greater than one-half of the circumference of the socket, and means for preventing separation of the edges adjacent the split, said means surrounding said socket, and overlying the edge of the coupling at one end thereof to protect the same.

4. The method of forming a coupling for connecting a handle to a mop or the like, which comprises the steps of forming a blank in the shape of a T, forming spaced openings in the outer end of the shank of the T, equally spaced from the central axis of the shank, forming a groove in the head of the T in a direction inclined to said axis, and bending the blank about said axis so that the head is given a substantially cylindrical shape and the sides of the shank are folded upon each other with said openings in register with each other.

5. The method of forming a coupling for connecting a handle to a mop or the like, which comprises the steps of forming a blank in the shape of a T, forming spaced openings in the outer end of the shank of the T, equally spaced from the center axis of the shank, forming a groove in the head of the T in a direction inclined to said axis, and bending the blank about said axis so that the head is given a substantially cylindrical shape, and the sides of the shank are folded upon each other with said openings in register with each other, and reinforcing the cylindrical portion against expansion.

In testimony whereof I have hereunto subscribed my name at Chicago, Cook County, Illinois.

JOSEPH W. BARTON.